United States Patent [19]

Okamoto

[11] Patent Number: 5,422,058

[45] Date of Patent: Jun. 6, 1995

[54] MOUNTING STRUCTURE OF SHEET GLASS ON WINDOW FRAME AND THE LIKE

[76] Inventor: Satoru Okamoto, 1-5-8-2609 Tomobuchi-Cho, Miyakojima-ku, Osaka City, Osaka-fu, Japan

[21] Appl. No.: 205,951

[22] Filed: Mar. 2, 1994

[30] Foreign Application Priority Data

Mar. 3, 1993 [JP] Japan .................. 5-93005 U

[51] Int. Cl.6 .................... B29C 39/10; B29C 39/36
[52] U.S. Cl. ................. 264/263; 156/244.17; 156/107; 156/108; 264/1.36; 264/1.38; 264/22
[58] Field of Search ........... 156/244.17, 107, 108; 264/263, 1.36, 1.38, 22

[56] References Cited

U.S. PATENT DOCUMENTS

| | | | |
|---|---|---|---|
| 4,543,283 | 9/1985 | Curtze et al. | 156/107 X |
| 4,734,477 | 3/1988 | Inoue et al. | 264/1.38 X |
| 4,830,804 | 5/1989 | Weaver | 264/263 X |
| 4,948,539 | 8/1990 | Byers | 264/22 |
| 4,951,927 | 8/1990 | Johnston et al. | 264/263 X |
| 4,999,147 | 3/1991 | Kojima et al. | 264/263 X |

FOREIGN PATENT DOCUMENTS

0171901 9/1984 Japan .
0188521 8/1986 Japan .

*Primary Examiner*—Michael W. Ball
*Assistant Examiner*—Francis J. Lorin
*Attorney, Agent, or Firm*—Notaro & Michalos

[57] ABSTRACT

Sheet glass to be mounted in a window or other various objects is reinforced so as not to be broken easily, and if broken, scattering is prevented. A water-tightness is also provided and it is easy to mount the window, on the objects. End edges of sheet glass in a desired size and shape is reinforced by ultraviolet curing resin.

1 Claim, 2 Drawing Sheets

MOUNTING STRUCTURE OF SHEET GLASS ON WINDOW FRAME AND THE LIKE

FIELD AND BACKGROUND OF THE INVENTION

The present invention relates to a mounting structure for sheet glass on automotive windshields, and other window panes on electronic components, industrial products, construction materials and the like.

The prior art is illustrated in FIGS. 3 and 4.

To mount and fix sheet glass on a window pane or other structure, generally a receiving frame 7 is preliminary provided, as shown in FIG. 3, at one side of the inside if a marginal frame 8 installed at the mounting area of the window of a building or other main body or equipment, and a sheet glass 4 is inserted onto the receiving frame 7. A stopping frame 7' is fitted to the corresponding position of the receiving frame 7 at the outside of the sheet glass 4, and by driving the stopping frame 7' into the marginal frame 8, the sheet glass is mounted and fixed in the marginal frame 8.

As shown in FIG. 4, by preliminary setting the receiving frame 7 at one side of the inside of the marginal frame 8 in the same manner as in FIG. 3, fitted into its side part, while the receiving frame 7' is fitted to the marginal frame 8 at the corresponding position of the receiving frame 7 at the outside of the sheet glass 4 by any means, a caulking agent 3' can be added into the gaps formed by the marginal frame 8, receiving frame 7, stopping frame 7', and edges of the sheet glass 4, thereby fixing and holding the sheet glass 4 in the marginal frame 8 in a water-tight manner.

In this case, instead of the caulking agent, silicone rubber or other soft material may be preliminarily put on the sheet glass, as an intervening member.

Of the conventional mounting structures of sheet glass, however, in the example shown in FIG. 3, there is no structure between the sheet glass 4 the and marginal frame 7 and upper frame 7', this area is not water-tight, and moreover it is not possible to increase the strength against breakage and cracks formed if there is an impact on the frame or at the edge of the glass, and as a result the broken pieces are scattered about.

In the example shown in FIG. 4, the caulking again is injected in the gaps of the marginal frame, receiving frame, stopping frame and sheet glass end edges, or silicone rubber is inserted, and this job not only requires a particular skill, but the caulking agent or silicone rubber is not effective for reinforcing strength against an impact, although it may be favorable for keeping the unit water-tight. Accordingly, in most cases where strength is required, combined sheet glass and reinforced glass may be used, but they are both expensive.

SUMMARY OF THE INVENTION

The invention is intended to solve the problems of mounting and strength in the prior art.

The sheet glass is reinforced by adhering and enclosing the edge area, edges or perimeter of the sheet glass in a support by means of ultraviolet light curing resin.

The sheet glass is also reinforced by compensating for the brittleness of sheet glass and by adding the strength of ultraviolet curing resin around the edge of the glass.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENT

Figure 1:
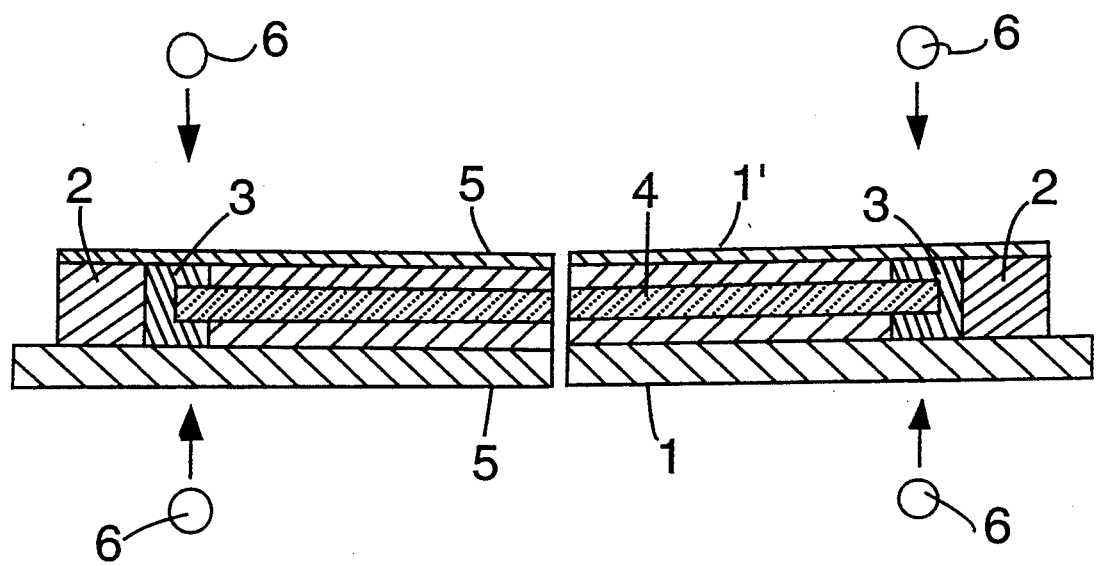
FIG. 1 is a longitudinal sectional view showing a sheet glass mounting arrangement of the invention.

Explaining an embodiment of the invention by referring to the accompanying drawings, the forming process is first shown in FIG. 1, in which a sheet glass 4 cut in predetermined shape and dimensions at a glass shop, an opaque form frame 2 in a similar shape to the sheet glass 4, being formed slightly larger, two opaque light shielding plates 5,5 made of rubber or the like in a similar shape to the sheet glass 4, being formed slightly smaller, a transparent support plate 1 for mounting the lower light shielding plate 5 and the form frame 2 thereon and a transparent plate 1' above, are combined. An ultraviolet light curing resin border 3 is injected in the gaps formed among the end edges, edge areas or perimeter of the sheet glass 4, the edge areas which are exposed by the light shielding plates 5,5 that do not reach these areas, and the frame 2. Ultraviolet rays are emitted at the ultraviolet curing resin border 3 in the gaps from the upper and lower surfaces through the upper and lower transparent plates 1,1' by corresponding-light emitting lamps 6,6. Thereby curing of the resin takes place and reinforcing the end edges of the sheet glass 4 is achieved.

As shown in FIG. 1, plate 4 has flat upper and lower surfaces covered in full contact by flat upper and lower shielding plates 5,5, which leave an exposed edge area of sheet glass 4, having upper, lower and outer surfaces. Frame 2 around the outer surfaces of the edge area forms a gap with the edge area. Upper and lower transparent plates 1,1' are also flat and are in full contact with upper and lower surfaces of the shielding plates 5,5 as well as upper and lower surfaces of the frame 2. This forms a rectangular U-shaped gap which is subsequently filled with uncured resin 3, and then cured to form the rectangular U-shaped border 3 shown in FIG. 2, with upper and lower flat parts that have the same thickness as plates 5,5'.

Figure 2:
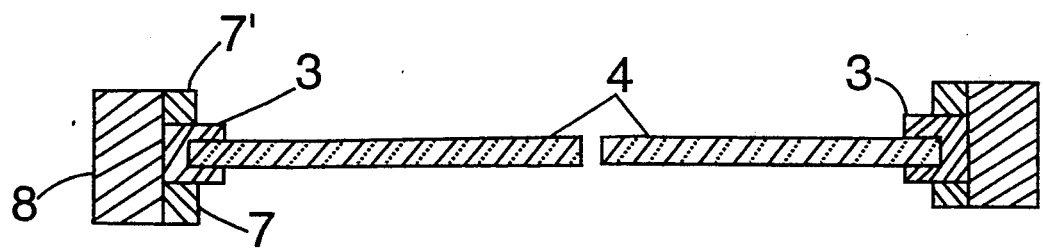
FIG. 2 is a longitudinal sectional view showing a sheet glass mounting procedure of the invention.
Figure 3:
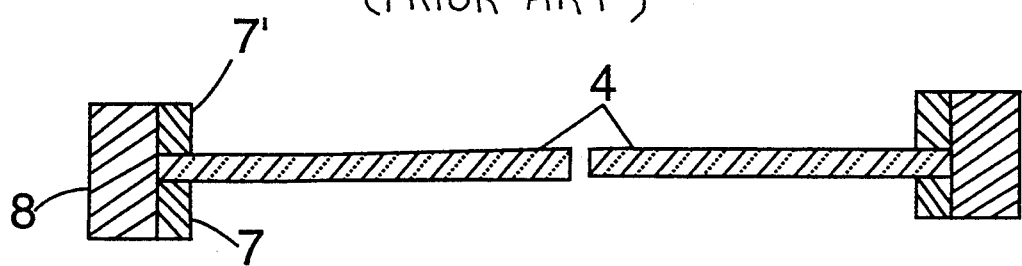
FIG. 3 is a longitudinal sectional view showing a prior art structure.
Figure 4:
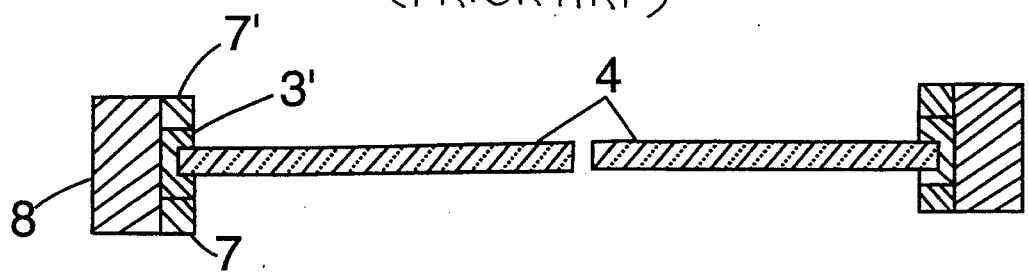
FIG. 4 is a longitudinal sectional view showing another prior art structure.

The thus obtained reinforced sheet glass and resin edge is held, as shown in FIG. 2, in the area of the ultraviolet curing resin 3 by the receiving frame 7 and stopping frame 7' on the inner circumference of the window and other marginal frame 8.

Various materials may be used for the ultraviolet curing resin depending on the applications, and for example, as shown in FIG. 2, when used as a window pane, by using various elastic resins, the material with water-tightness and resistance to vibration may be obtained, or when used as an automotive windshield, further water-tightness is required, and this purpose may me achieved by using more elastic resin than in the case of a window pane.

Types of ultraviolet curing resin include, among others, epoxy resin, acrylic resin, and vinyl chloride resin, and the shape and dimensions of the sheet glass may be preliminary processed at a glass shop depending on the object of installation. Elastic ultraviolet curing resins suited to the purpose should be selected.

The sheet glass processed as shown in FIG. 2 is hard to break, and it can be directly brought into the site and installed by general workers, not depending particularly on glassworkers, and the working time can be short. Since the entire sheet glass is reinforced by the resin on its circumference, scattering of broken pieces may be prevented should the glass be broken.

Unlike ordinary sheet glass, a hole can be drilled very easily in the portion of ultraviolet curing resin 3, so that the sheet glass may be fastened to the object easily with screws, and by using any particular waterproof means for mounting, so that in all cases the require water proofness is achieved.

According to the invention, by reinforcing the end edges or perimeter of the sheet glass panel with ultraviolet curing resin, the sheet glass itself can be strengthened if the resin is hard, and it is easy to handle, and if cracked by impact, scattering can be prevented by the peripheral resin, which holds the piece fixed, so that safety may be guaranteed.

Moreover, since it is easy to drill a hole in the resin part, it can be fastened to a frame or other object by using screws, instead of mounting by fitting in, and it is applicable to various mounting conditions.

By using an elastic resin, in addition, the water-tightness may be easily assured only be mounting, without resort to any particular waterproof means.

Whatever resin may be used, generally, it can be prefabricated in a workshop, and brought to the site of installation and assembled, so that it can be handled and mounted easily by general workers, not by professional glassworkers, and time and labor can by saved. The hardness of the resin can be obtained widely, from ridge material to elastic and soft material, only by selecting the kind of resin, so that versatile market meeds may be easily satisfied.

While a specific embodiment of the invention has been shown and described in detail to illustrate the application of the principles of the invention, it will be understood that the invention may be embodied otherwise without departing from such principles.

What is claimed is:

1. A method of forming a mounting assembly for a sheet glass in a window frame comprising the steps of:

providing a flat piece of sheet glass having a selected size and including a perimeter therearound with an edge area extending along the perimeter, the sheet glass having opposite flat surfaces;

covering the opposite flat surfaces with two flat, opaque light shielding plates which are smaller in size than the sheet glass for exposing upper, lower and outer surfaces of the edge area, around the perimeter, the shielding plates being in contact with the entire surfaces of the sheet glass that is covered;

positioning the sheet glass and shielding plates within a frame with a gap formed between the exposed outer surface of the edge area and the frame;

covering upper and lower surfaces of the shielding plates, the gap and at least part of the frame with flat, upper and lower transparent plates, which are transparent to ultraviolet light to make the gap a rectangular U-shape, the transparent plates being in full contact with outer surfaces of the shielding plates;

injecting uncured resin which is curable using ultraviolet light, into the U-shaped gap formed between the exposed edge area around the perimeter of the sheet glass, the upper and lower transparent plates, and the frame, for filling the U-shaped gap with uncured resin;

exposing the uncured resin through both transparent plates to ultraviolet light for curing the resin into a rectangular U-shaped border having flat upper and lower parts over the upper and lower surfaces of the edge area that are equal in thickness to the shielding plates, and a flat edge part over the outer surface of the edge area, the curable resin being selected from the group consisting of epoxy resin, acrylic resin and vinyl chloride resin; and removing the plates and the frame from the sheet glass with U-shaped border.

* * * * *